United States Patent [19]

Horine et al.

[11] 4,085,552
[45] Apr. 25, 1978

[54] WORK TOOL STAND

[75] Inventors: James H. Horine, Lexington; Lowell K. Watts; Hershel R. Wininger, both of Richmond; Dale Kelley, London; Charles L. Sears, Somerset, all of Ky.

[73] Assignee: Irvin Industries, Inc., Stamford, Conn.

[21] Appl. No.: 776,703

[22] Filed: Mar. 11, 1977

[51] Int. Cl.$^2$ .............................................. B24B 41/00
[52] U.S. Cl. .................................................. 51/166 R
[58] Field of Search ........ 51/166 R, 166 TS, 170 EB; 144/1 C, 35 A

[56] References Cited

U.S. PATENT DOCUMENTS

| 3,177,622 | 4/1965 | Miller | 51/166 R |
| 3,828,484 | 8/1974 | Baechle | 51/170 EB |
| 3,983,664 | 10/1976 | Martin | 51/170 EB |

Primary Examiner—Harold D. Whitehead
Assistant Examiner—Roscoe V. Parker
Attorney, Agent, or Firm—McAulay, Fields, Fisher & Goldstein

[57] ABSTRACT

A stand for selectively supporting a work tool, such as a belt sander or the like, in either a vertical or horizontal position. The sanding tool is mounted to a support plate which is pivotally disposed for movement from a first position wherein the tool is supported in a vertical position to a second position wherein the tool is supported in a horizontal position. The stand further comprises a work support platform detachably connected to the support plate. The platform includes a pivotally connected work table that is adjustably located in a selected position within a predetermined range of positions.

11 Claims, 8 Drawing Figures

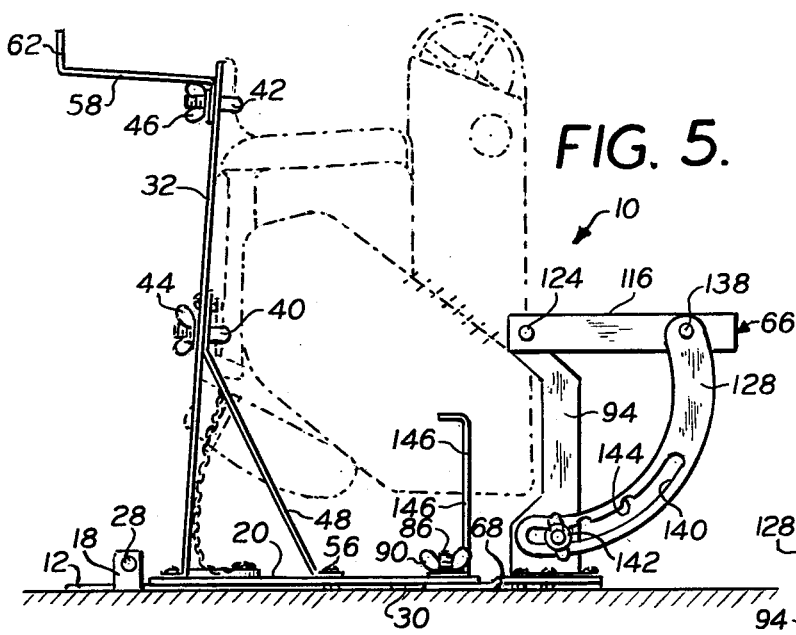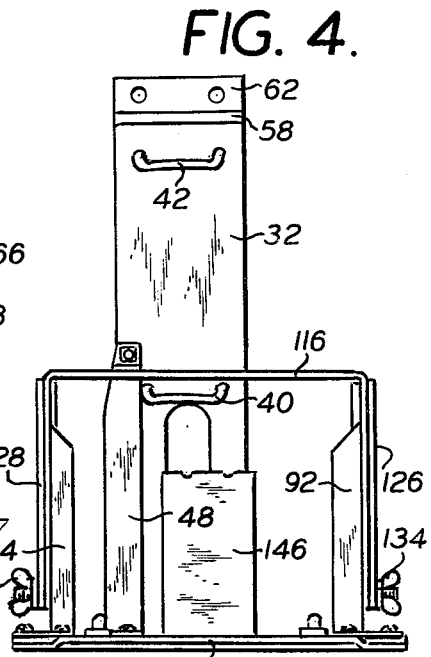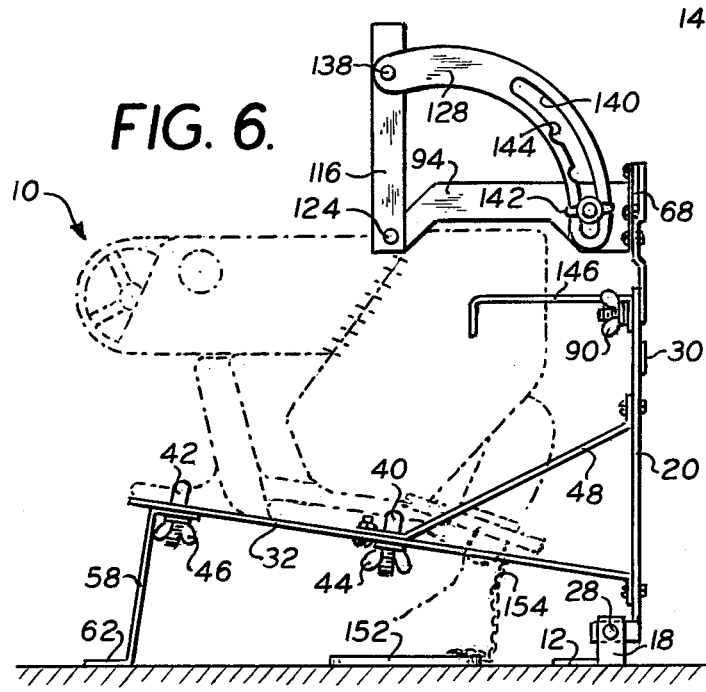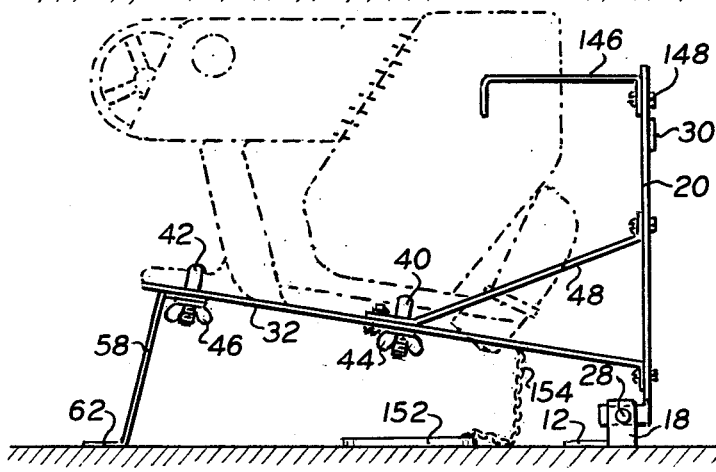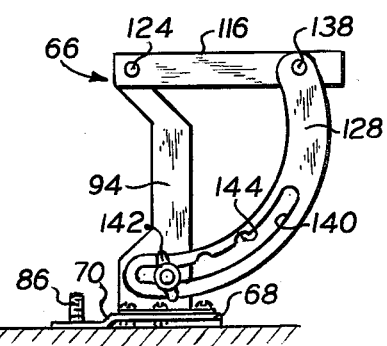

WORK TOOL STAND

BACKGROUND OF THE INVENTION

1. Field of the Invention

This invention relates generally to a work tool stand, and more particularly, to a stand for selectively supporting a work tool, such as a belt sander or the like, in either a horizontal or vertical position.

2. Brief Description of the Prior Art

Heretofore, it has been proposed to support working tools on a stand or support table so that the operator is free to use both hands to advance the work piece toward and against the action of the work tool. For example, there are numerous support tables in existence that conveniently have an electrically driven saw or drill mounted on the support structure. In some instances, the position of the saw or drill is fixed whereas in other applications of use, the height or elevation of the saw or drill relative to a stationary surface of the table is adjustable. In still further applications, the angular orientation of the saw or drill relative to the stationary surface may be varied for making angled cuts in the work piece or drilling slanted holes therein. These support tables are invariably rather large and are designed to be fixed in position when in use. In other words, they can hardly be considered to be portable in the sense of being conveniently movable from one location to another, as desired, to perform a selected operation.

While there may be instances where a small work tool, such as an electric drill, may be mounted to a portable stand which the operator can rest on a work bench, such stands merely serve to support the drill in a fixed or only a single position. In other words, there is relatively little freedom in locating the drill in more than one position to perform the desired operation. This inconvenience, which is inherent in known work tool stands, becomes a more significant problem when the work product is subjected to a sanding operation.

Heretofore, in performing a sanding operation, it was necessary for the operator to fixedly support the work piece and then manually engage the sanding tool against the piece. Alternatively, in some applications, the sanding element may be mounted on a support structure which, again, is fixed in position. In such instances, the sanding element is in the form of a belt which is rotatably driven. Here, again, there is limited flexibility in using the sander since it is not supported for movement or operation in more than one position. It thus is apparent that there is a need for a portable work tool stand that can support a belt sander for use in performing a sanding operation, and which permits the sander to be selectively supported in either a horizontal or vertical position to afford increased versatility when the sander is in use.

SUMMARY OF THE INVENTION

The work tool stand of the present invention provides for a fixed plate and a support plate. The support plate has one edge pivotally connected to the fixed plate to render the support plate movable with respect to the fixed plate. In this regard, the support plate is disposed for movement from a first position wherein the support plate lies in a plane substantially parallel to the plane of the fixed plate, to a second position wherein the support plate lies in a plane intersecting the plane of the fixed plate. A bracket is mounted on the support plate and is provided with clasp means adapted to mount the sanding tool thereon and permit movement of the tool conjointly with movement of the support plate.

The bracket is constructed having a leg portion which is located in spaced relation to the support plate. The arrangement is such that the fixed plate and the support plate constitute adjacent supports of the stand when the support plate is in its first position. Furthermore, the fixed plate and the leg of the bracket constitute spaced supports of the stand when the support plate is in its second position. The sanding tool is mounted to the bracket in a manner such that the sander is supported in a vertical position when the support plate is in its first position, and the sander is supported in a horizontal position when the support plate is in its second position.

The invention further provides for a work support platform that is detachably connected to a second edge of the support plate. The platform also includes a work table that is adjustably located in a selected position within a predetermined range of positions. The construction is such that the operator now has greater flexibility in selectively supporting the sanding tool in either one of two positions, and can also choose between having the work support platform move conjointly with movement of the support plate or remain fixed in position relative to the movement of said support plate.

Accordingly, the main object of the present invention is to provide a stand for selectively supporting a belt sander in either one of two positions.

Another object and feature of the present invention is to provide a portable stand for a belt sander having a work support platform detachably connected to the stand, and which platform includes a work table that is adjustably located in a selected position within a predetermined range of positions.

Another object and feature of the present invention is to provide a stand for a hand tool which enables it to be used as a bench tool, and wherein the operator is free to use both hands to advance the work piece against the tool.

A further object, feature and advantage of the present invention is to provide a portable stand for a belt sander which has relatively few parts, is sturdy in construction and gives long lasting service.

The above and other objects, features and advantages of the present invention will become more apparent from a full consideration of the following detailed description when taken in conjunction with the accompanying drawings:

BRIEF DESCRIPTION OF THE DRAWINGS

FIG. 4 is a left side elevational view of the stand illustrated in FIG. 1;

FIG. 5 is a back elevational view of the stand illustrated in FIG. 1, and further illustrating the belt sander, in phantom, supported in a vertical position;

FIG. 6 is a view similar to FIG. 5 illustrating a portion of the stand rotated to support the sander in a horizontal position;

FIG. 7 is a view similar to FIG. 6, but with the work support platform detached from the stand.

DESCRIPTION OF THE PREFERRED EMBODIMENT

Figure 1:
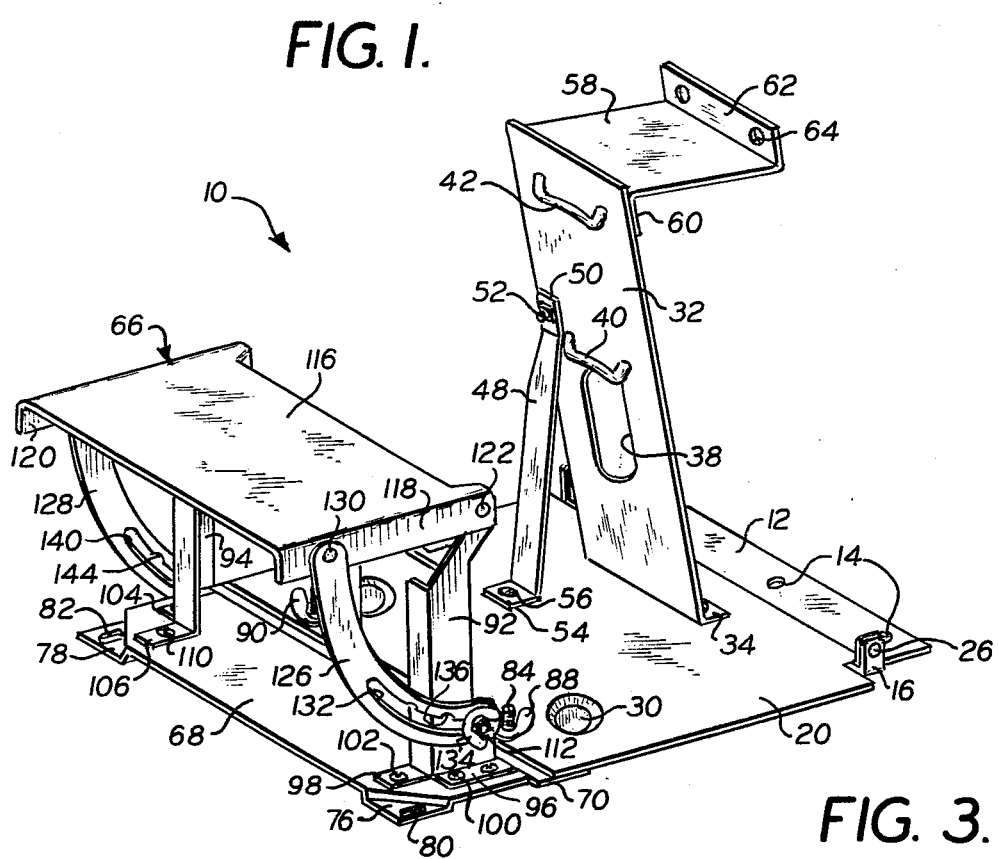
FIG. 1 is a perspective view of the work tool stand constructed in accordance with the present invention.
Figure 2:
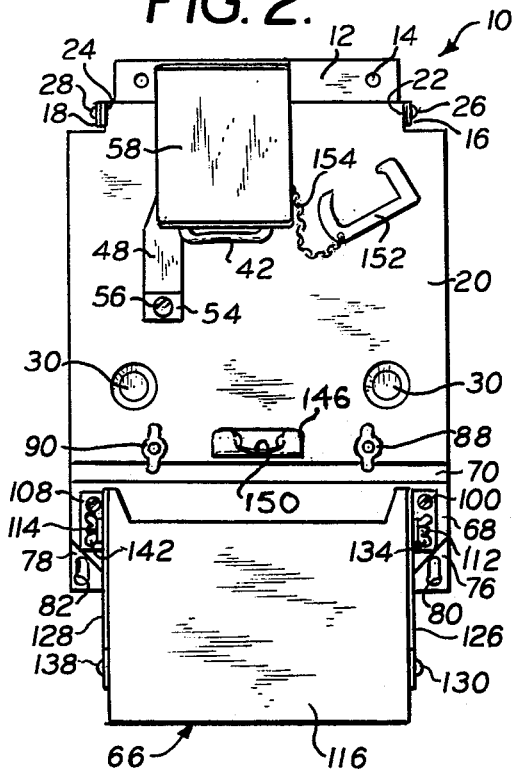
FIG. 2 is a top plan view of the stand illustrated in FIG. 1.

Referring to the drawings, particularly FIGS. 1-4 and 8, numeral 10 represents a work tool stand constructed in accordance with the present invention. Stand 10 comprises a fixed plate 12 formed having a plurality of spaced openings 14 for receiving a screw or other fastening member for the purpose of fixedly securing the plate to a flat surface. Alternatively, the operator may choose to merely let the stand lie on the supporting surface without fixedly securing plate 12 in place. In this sense, the term "fixed" is used to denote a plate of the stand that is intended to remain stationary, and about which other portions of the stand rotate in selectively supporting the work tool in either one of two positions. The longitudinally spaced ends of plate 12 are formed having cut out portions to define first and second strips which are bent upwardly to repesent posts 16 and 18, respectively. A through-opening is provided in each of said posts to facilitate the connecting of a support plate 20 to plate 12 in the manner hereinafter described.

Figure 3:
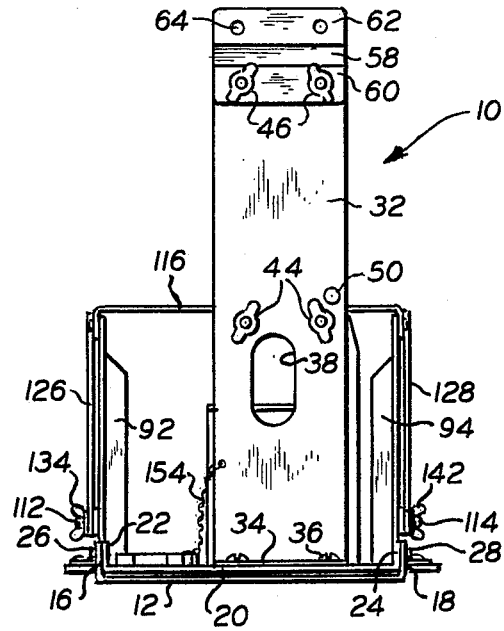
FIG. 3 is a right side elevational view of the stand illustrated in FIG. 1.

The support plate 20 is similarly constructed having spaced cut out portions along one end edge to define first and second strips which are bent upwardly, as viewed in FIGS. 1 and 3, to represent posts 22, 24 respectively. Each of said posts 22, 24 are also formed having through-openings therein. The arrangement is such that when support plate 20 is positioned adjacent fixed plate 12, the posts 16, 22 and the posts 18, 24 are juxtaposed in position to render their respective openings in alignment for receiving rivets or pivot pins 26, 28 respectively. In other words, support plate 20 is pivotally connected to fixed plate 12 and is disposed for movement relative thereto. In practice, support plate 20 lies in a plane slightly above the plane of fixed plate 12, and is formed having a plurality of detent portions 30 which constitute feet for resting support plate 20 on a flat surface, as viewed in FIG. 5. This serves to elevate support plate 20 above the flat surface and create a space therebetween to accommodate fastening members used in assemblying other component parts of the stand to the support plate.

The bracket 32 is mounted on support plate 20 and extends upwardly therefrom when the plate is in the position shown in FIG. 1. In this regard, the lower edge portion of bracket 32 is bent to represent a flange 34 which rests upon support plate 20. Suitable aligned openings are formed in flange 34 and support plate 20 for receiving fastening members, such as locking screws and nuts, represented by numeral 36. An elongated opening 38 is provided in bracket 32 which extends longitudinally thereof to accommodate a portion of the sanding tool when it is mounted to the stand, as viewed in FIGS. 5-7. The mounting of the sanding tool to the stand is performed by utilizing a pair of U-shaped bolts 40 and 42, respectively, which serve to clamp the sanding tool to the bracket. In this regard, the bight portions of the respective bolts 40, 42 receive spaced portions of the sanding tool while the ends of said bolts pass through suitable openings formed in bracket 32. The ends of said bolts are threaded and receive wing nuts 44 and 46, respectively. The bight portions of said bolts 40, 42 are coated with a cushioning substance to prevent damage to the sanding tool when the bolts clasp said tool in its mounted position. The arrangement is such that the sanding tool is mounted for movement conjointly with the pivotal movement of support plate 20 in the manner hereinafter described.

In order to provide increased support for the bracket 32 when the sanding tool is mounted thereto, a brace 48 is utilized having one end 50 secured to the said bracket by means of fastening members 52 paassing through suitable openings formed in said brace and bracket. The opposite end 54 of brace 48 is bent to lie flat on support plate 20 and is also secured thereby by means of fastening members 56 passing through suitable openings in said component parts of the stand.

Stand 10 is further constructed having a leg 58 connected to the outer end portion of bracket 32, and projecting outwardly therefrom as viewed in FIGS. 1 and 5. In this regard, one end 60 of leg 58 is bent to lie flat against said bracket and is secured thereto by means of the same wing nuts 46, heretofore referred to in connection with the description of U-bolt 42. passing through suitable openings in said leg end portion. The opposite end 62 of said leg 58 is also bent to represent a foot which, in combination with the fixed plate 12, constitute spaced supports of said stand when the support plate 20 is rotated to the position shown in FIGS. 6 and 7. Foot 62 is formed having a plurality of laterally spaced openings 64 for receiving a screw or other fastening member for the purpose of fixedly securing said foot to a flat surface, if desired, when said foot is in the position shown in said FIGS. 6 and 7.

Figure 8:
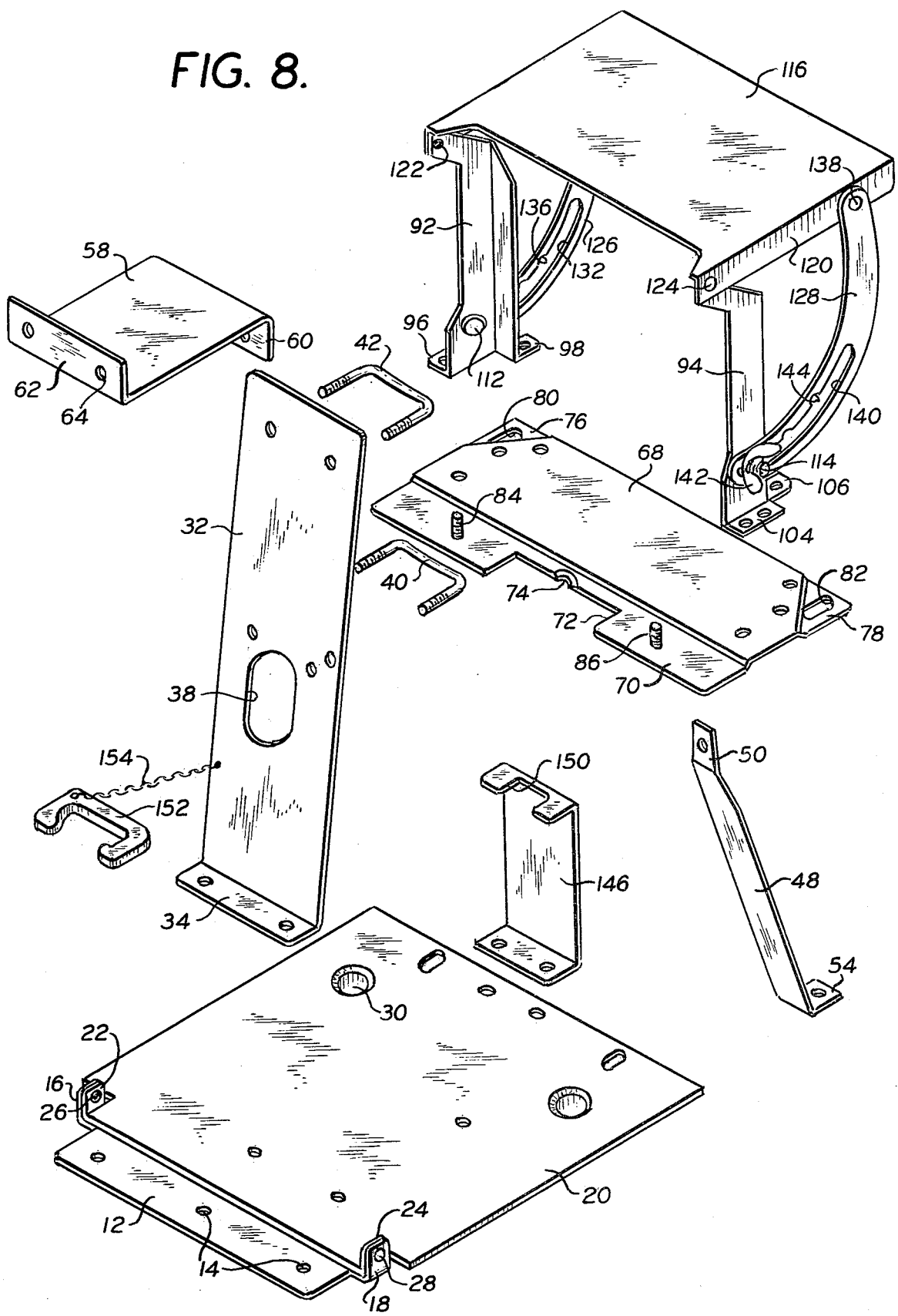
FIG. 8 is an exploded perspective view of the component parts of the stand.

Stand 10 further includes a work support platform, represented generally by numeral 66, which is detachably connected to another edge of support plate 20. Referring to the drawings, particularly FIGS. 1 and 8, platform 66 comprises a support plate 68 having an offset edge portion 70 extending longitudinally the length of the plate. Edge portion 70 is formed having a cut out portion 72 located intermediate the ends thereof. A detent 74 is formed along one of the edges defining the cut out portion 72 which constitutes a foot for resting the plate 68 on a flat surface. The opposite edge of support plate 68 is also formed having offset corner portions 76 and 78, respectively, which similarly constitute support feet for the plate. The feet 74, 76 and 78 serve to raise the central portion of support plate 68 above the flat surface and create a space therebetween to accommodate additional fastening members used in assemblying other component parts of the platform to the plate. The offset corner portions 76, 78 are each formed with openings 80 and 82, respectively, for receiving a screw or other fastening member for the purpose of fixedly securing said platform to the flat surface, if desired.

Projecting upwardly from the offset edge portion 70 of support plate 68 are a pair of spaced bolts 84 and 86 located, respectively, on opposite sides of cut out portion 72. Bolts 84, 86 are adapted to project through suitable openings in said other edge of support plate 20 and receive wing nuts 88 and 90, respectively. In practice, platform support plate 68 is connected to the edge of support plate 20 which is opposite to that edge of plate 20 that is connected to fixed plate 12. The arrangement is such that when support plates 68 and 20 are connected together, as viewed in FIGS. 1-6, the platform support plate 68 is disposed for movement conjointly with support plate 20. However, when wing nuts 88, 90 are removed from their associated bolts, the two support plates 68, 20 are, in effect, disconnected from each other. In such event, the platform support plate 68 may be defined as remaining fixed in position, as viewed in FIG. 7, relative to the pivotal movement of support plate 20.

Projecting upwardly from the central portion of support plate 68 are a pair of spaced channel brackets 92 and 94. In this regard, the lower end of bracket 92 is formed having bent flanges 96 and 98 which rest on support plate 68. The flanges and support plate have aligned openings through which are received the fastening members 100 and 102, respectively. Similarly, the lower end of bracket 94 is formed having bent flanges 104 and 106 which receive fastening members 108 and 110, respectively, passing through suitable openings in said flanges and said support plate. The channel brackets 92, 94 project upwardly from opposite edges of support plate 68. Projecting outwardly from brackets 92 and 94 are threaded bolts 112 and 114, respectively. Bolts 112, 114 project outwardly from opposite sides of the associated brackets and in directions away from each other. These bolts represent portions of fastening members for adjustably locking a work table 116 in a selected position, within a predetermined range of positions, in the manner hereinafter described.

The work table 116 has a longitudinally extent slightly greater than the span between said channel brackets 92, 94. The longitudinal edges of table 116 are bent downwardly and define flanges 118 and 120. The work table 116 is pivotally connected to the brackets 92, 94 by means of rivets or pivot pins 122 and 124, respectively, passing through suitable openings in said flanges and the upper ends of said brackets.

In order to adjustably position work table 116 within a predererimined range of positions, a pair of curved arms 126 and 128 are provided respectively extending from opposite sides of said table 116 to an associated one of the brackets 92, 94. In this regard, arm 126 has one end connected to table flange 118 by means of rivet 130. The other end portion of arm 126 is slidably connected to bracket 92 by means of an elongated curved opening 132 formed in arm 126, which opening receives the end of threaded bolt 112. A wing nut 134 engages with bolt 112 for adjustably locking said arm 126 in place. One of the edges defining the opening 132 is further formed having a plurality of arcuate cut out portions 136 which define "stops" in adjusting the position of arm 126 relative to bracket 92. In this regard, bolt 112 is intended to be received in a selected one of said cut out portions 136 whereupon nut 134 may then be tightly fastened to said bolt.

Similarly, arm 128 has one of it ends connected to table flange 120 by means of rivet 138. The other end portion of arm 126 is slidably connected to bracket 94 by means of an elongated curved opening 140 formed in arm 128, which opening receives the end of threaded bolt 114. A wing nut 142 engages with bolt 114 for adjustably locking said arm 128 in place. Arm 128, similar to arm 126, is constructed having a plurality of arcuate cut out portions 144 located along one of the edges defining the opening 140. These cut out portions function as "stops" similar to the cut out stop portions 136 referred to in connection with the description of arm 126.

Referring to FIGS. 5-7, there is illustrated the manner in which the sanding tool is selectively supported in either one of two positions. In this regard, the work tool is mounted to bracket 32 by means of the U-shaped bolts 40 and 42. In order to provide additional support for the sanding tool in its mounted position, an additional bracket 146 is provided which is mounted to support plate 20 and extends upwardly therefrom, as viewed in FIGS. 2 and 5. The lower end of bracket 146 is bent to lie flat on support plate 20 and is secured in place by means of fastening member 148 passing through suitable openings formed in said bent end portion and in support plate 20. The upper end of bracket 146 is similarly bent and formed with a cut out portion 150 for receiving and supporting a portion of the sanding tool thereon. The upper end portion is also coated with a cushioning substance to prevent damage to the sanding tool in its mounted position. Bracket 146 is located in spaced and facing relation to the main bracket 32.

In order to free the operator's hands when guiding the work piece against the sanding tool, the "on-off" switch of the tool may be clamped in the "on" position by means of a switch engaging clamp 152 which is connected to the main bracket 32 by means of a flexible chain 154. The use of such clamp 152 is optional since many tools have been built in mechanisms for holding the operating switch in a selected position.

FIG. 5 shows the sanding tool supported in a vertical position when support plates 20 is in a horizontal position. In this arrangement, support plate 20 may be defined as lying in a plane substantially parallel to the plane of fixed plate 12. It is also noted that when support plate 20 is in its horizontal position, the fixed plate 12 and the detent portions 30 constitute supports of the stand 10 as it rests on a supporting surface. When the sanding tool is in its vertical position, the work table 116 functions as a platform in guiding the work piece against the action of the tool. Furthermore, in such position, mitered edges of the work piece may be sanded by adjusting the angle of work table 116.

In order to change the position of the sanding tool, It is only necessary to rotate support plate 20 counterclockwise relative to fixed plate 12, as viewed in FIG. 6, about pivot pins 26, 28. This serves to now locate support plate 20 in a vertical position whereby the sanding tool is supported in a horizontal position. In this arrangement, support plate 20 may be defined as lying in a plane intersecting the plane of fixed plate 12. It is also noted that when support plate 20 is in its vertical position, the fixed plate 12 and the foot 62 of bracket leg 58 constitute spaced supports of the stand 10 as it rests on a supporting surface. In some instances, the operator may choose to disconnect the work support platform 66 from support plate 20 prior to rotating said support plate to its vertical position. This is achieved by merely removing the wing nuts 88, 90 whereupon the work support platform will remain fixed in position, as viewed in FIG. 7, relative to rotational movement of said support plate. In this arrangement, the support plate 68 associated with work platform 66 may be defined as lying in a plane substantially parallel to the plane of support plate 20 when said plates are connected together for conjoint movement. However, when the plates are disconnected and plate 20 is rotated to its vertical position, then the platform plate 68 may be defined as being relatively fixed in position and lying in a plane substantially parallel to the plane of fixed plate 12.

Accordingly, support plate 20 may further be defined as being pivotally disposed for movement from a first position, as shown in FIG. 5, to a second position, as shown in FIGS. 6 and 7. The first position of support plate 20 corresponds to its horizontal position whereas the second position of said plate corresponds to its vertical position.

The main component parts of the stand are constructed of steel which provides a sturdy unit intended to give long lasting service. The stand also has relatively few parts to facilitate ease in assembly.

While a preferred embodiment of the invention has been shown and described in detail, it will be readily understood and appreciated that numerous omissions, changes and additions may be made without departing from the spirit and scope of the present invention.

We claim:

1. A stand for selectively supporting a work tool in either one of two positions, said stand comprising:
   (a) a fixed plate;
   (b) a support plate having one edge pivotally connected to said fixed plate and disposed for movement from a first position wherein said support plate lies in a plane substantially parallel to the plane of said fixed plate, to a second position wherein said support plate lies in a plane intersecting the plane of said fixed plate;
   (c) a bracket mounted on said support plate and extending upwardly therefrom when said plate is in its first position, said bracket having clasp means adapted to mount the work tool thereon and permit movement of said tool conjointly with movement of said plate;
   (d) said bracket further having a leg projecting outwardly therefrom when said support plate is in its first position, said leg being located in spaced relation to said support plate;
   (e) said fixed plate and said support plate constituting adjacent supports of said stand when said support plate is in its first position; and
   (f) said fixed plate and said leg constituting spaced supports of said stand when said support plate is in its second position; and
   (g) a work support platform detachably connected to a second edge of said support plate;
   whereby the work tool is supported in a first position when said support plate is in its first position and said work tool is supported in a second position when said support plate is in its second position.

2. The stand as recited in claim 1, further comprising a second bracket mounted on said support plate and extending upwardly therefrom when said plate is in its first position, said second bracket being spaced from and facing said first bracket and being adapted to engage with and support a portion of the work tool thereon when said work tool is mounted to said first bracket.

3. The stand as recited in claim 1, further comprising a brace extending between said support plate and said bracket to provide increased support for said bracket in its mounted position.

4. The stand as recited in claim 1, further comprising a switch engaging clamp adapted to engage the switch of said work tool and hold said switch in a selected position.

5. The stand as recited in claim 1, wherein the work tool is supported in a vertical position when said support plate is in its first position, and the work tool is supported in a horizontal position when said support plate is in its second position.

6. The stand as recited in claim 1, wherein said work support platform comprises:

(a) a second support plate detachably connected to the second edge of said first support plate, said second support plate being disposed for conjoint movement with said first support plate when said plates are connected to each other, and said second support plate remaining fixed in position relative to the movement of said first support plate when said plates are disconnected from each other;
(b) first and second spaced brackets mounted on said second support plate and extending upwardly therefrom when said plate is in its fixed position; and
(c) a work table pivotally connected to said bracket.

7. The stand as recited in claim 6, wherein said second support plate lies in a plane substantially parallel to the plane of said first support plate when said plates are connected to each other, and wherein said second support plate lies in a plane substantially parallel to the plane of said fixed plate when said second support plate is in its fixed position.

8. The stand as recited in claim 6, wherein said work table has first and second opposed end edges; said work support platform further comprising first and second curved arms respectively extending between the first and second end edges of said table and said first and second spaced platform bracket; and interengaging fastening means on said brackets and said arms for adjustably locking said work table in a selected position within a predetermined range of positions.

9. The stand as recited in claim 8, wherein said fastening means comprises a fixed bolt mounted on each of said brackets and projecting ourwardly therefrom; each of said arms having an elongated curved opening adapted to receive a separate one of said bolts and permit arcuate sliding movement of said arms relative to said bolts; and a lock nut threadedly engaging each of said bolts for locking said work table in position.

10. A stand for selectively supporting a work tool such as a belt sander or the like in either a vertical or horizontal position, said stand comprising:
   (a) a fixed plate;
   (b) a support plate having one edge pivotally connected to said fixed plate and disposed for movement from a first position wherein said support plate lies in a plane substantially parallel to the plane of said fixed plate, to a second position wherein said support plate lies in a plane intersecting the plane of said fixed plate;
   (c) a first and second bracket mounted on said support plate and extending upwardly therefrom when said plate is in its first position;
   (d) said first bracket having clasp means adapted to mount the sanding tool thereon and permit movement of said tool conjointly with movement of said plate;
   (e) said second bracket being spaced from and facing said first bracket and being adapted to engage with and support a portion of the sanding tool thereon when said tool is mounted to said first bracket;
   (f) a brace extending between said support plate and said first bracket to provide increased support for said first bracket in its mounted position;
   (g) said first bracket further having a leg projecting outwardly therefrom when said support plate is in its first position, said leg being located in spaced relation to said support plate;

(h) said fixed plate and said support plate constituting adjacent supports of said stand when said support plate is in its first position; and
(i) said fixed plate and said leg constituting spaced supports of said stand when said support plate is in its second position; and
(j) a work support platform detachably connected to a second edge of said support plate; whereby the sanding tool is supported in a vertical position when said support plate is in its first position and said sanding tool is supported in a horizontal position when said support plate is in its second position.

11. The stand as recited in claim 10, wherein said work support platform comprises:

(a) a second support plate detachably connected to the second edge of said first support plate, said second support plate being disposed for conjoint movement with said first support plate when said plates are connected to each other, and said second support plate remaining fixed in position relative to the movement of said first support plate when said plates are disconnected from each other;
(b) first and second spaced brackets mounted on said second support plate and extending upwardly therefrom when said plate is in its fixed position; and
(c) a work table pivotally connected to said brackets and adjustably located in a selected position within a predetermined range of positions.

* * * * *